United States Patent [19]
Trumbo et al.

[11] Patent Number: 4,565,299
[45] Date of Patent: Jan. 21, 1986

[54] PRESSURE SEALING CLOSURE SYSTEM FOR RETORT VESSELS

[75] Inventors: Leroy C. Trumbo; Robert L. Feasel, both of Memphis, Tenn.

[73] Assignee: Trumbo Welding & Fabricating Company, Inc., Memphis, Tenn.

[21] Appl. No.: 703,499

[22] Filed: Feb. 20, 1985

[51] Int. Cl.[4] .............................................. B65D 88/44
[52] U.S. Cl. ..................................... 220/323; 220/211
[58] Field of Search ............... 220/211, 323, 314, 291; 292/43; 49/395, 68, 147, 148

[56] References Cited
U.S. PATENT DOCUMENTS

| | | | |
|---|---|---|---|
| 4,467,936 | 8/1984 | Makhijani | 220/323 |
| 4,519,519 | 5/1985 | Meuschke et al. | 220/323 |

*Primary Examiner*—George T. Hall
*Attorney, Agent, or Firm*—Harvey B. Jacobson

[57] ABSTRACT

A pressure vessel mounts hinges adjacent its open end for pivotal displacement of a door between open and closed positions, the hinges being raised and lowered with the door by power operated means. The door may be closed when lowered into roller-supported alignment with power operated locking means which includes toggle linkages for clamping the door to the vessel. Power operated safety pins hold the linkages in the locked condition.

22 Claims, 17 Drawing Figures

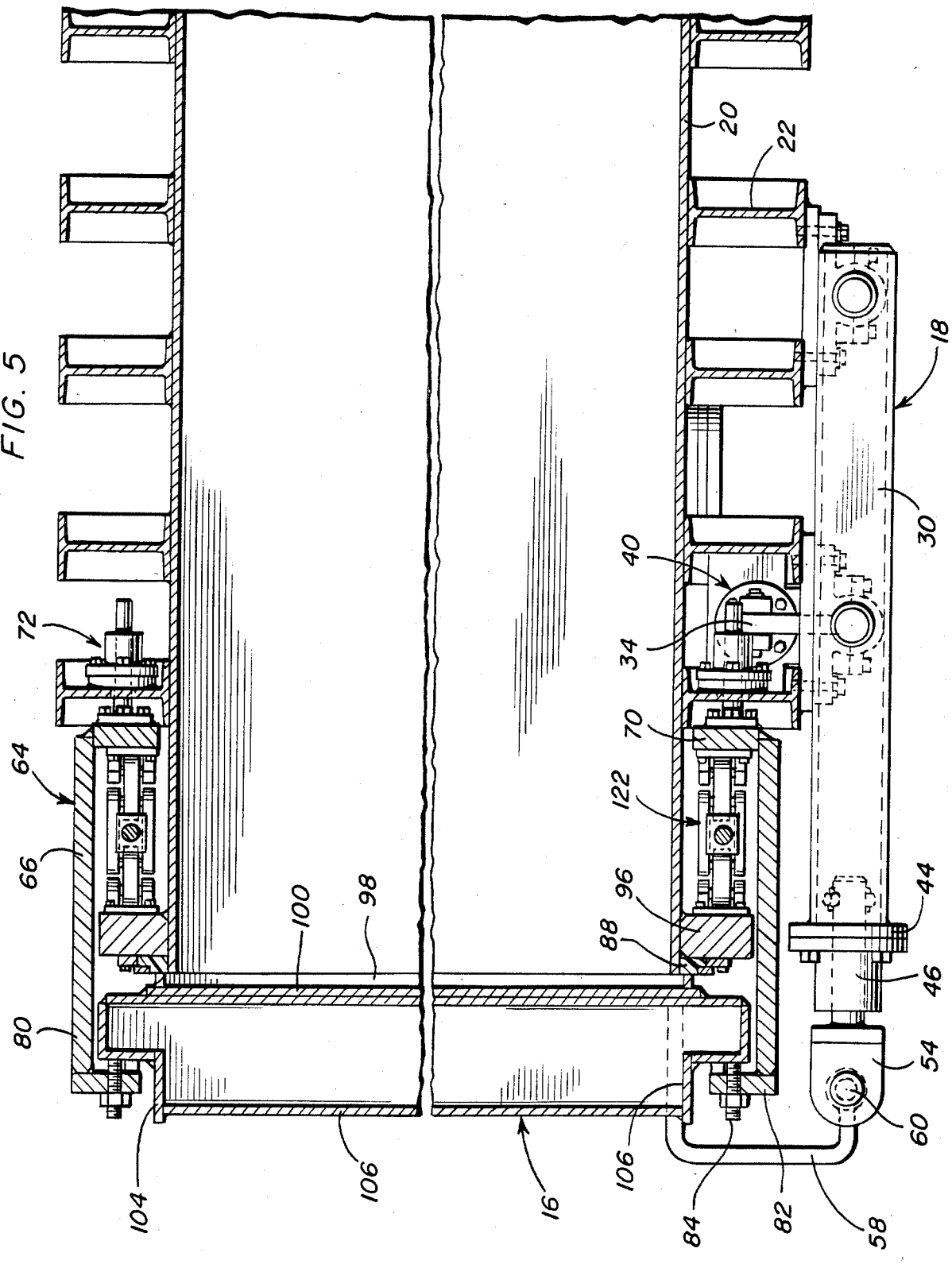

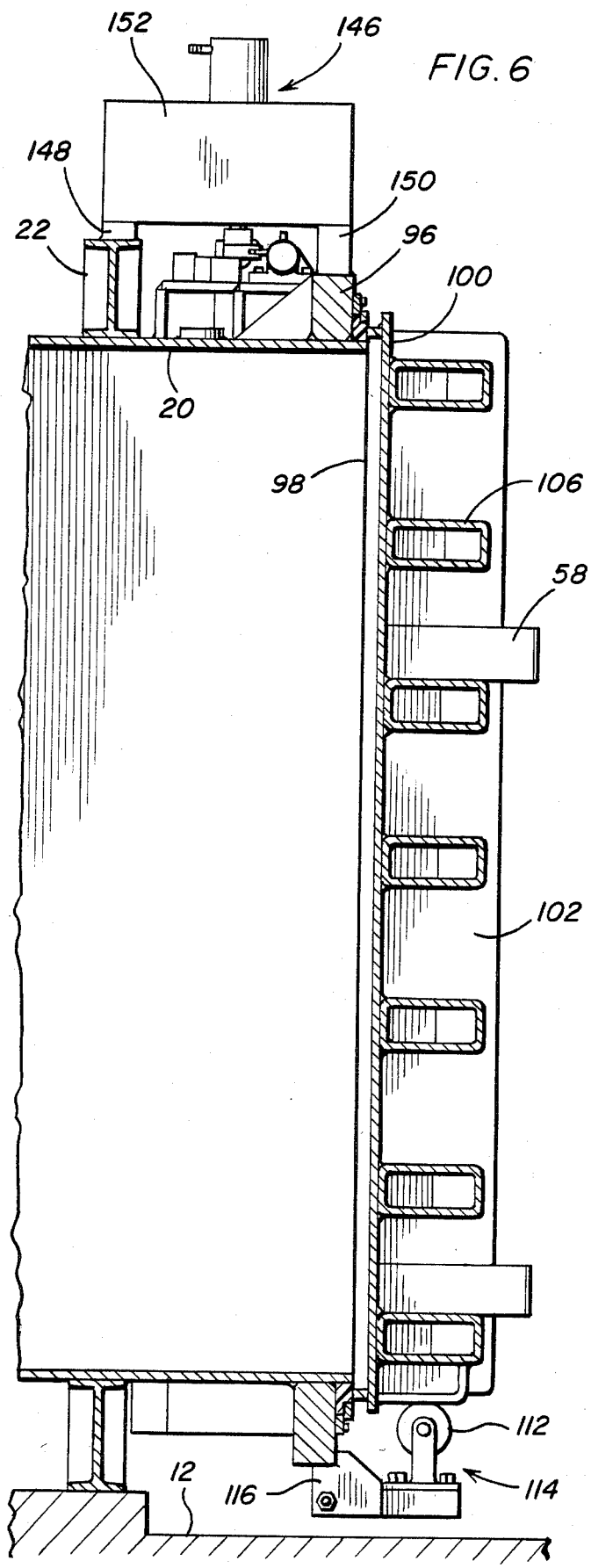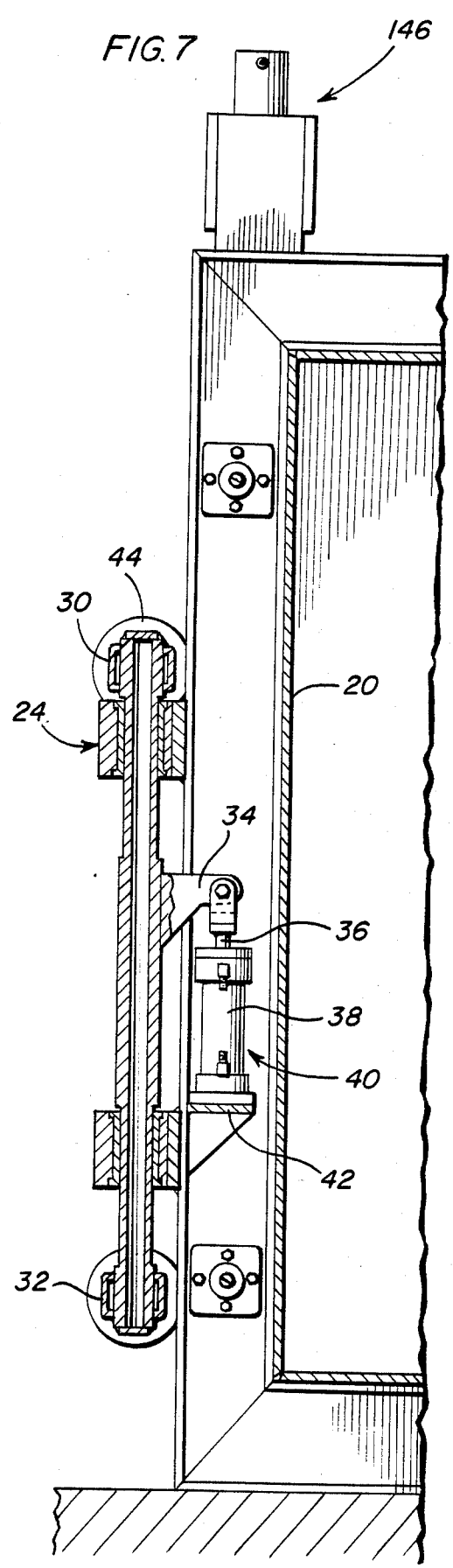

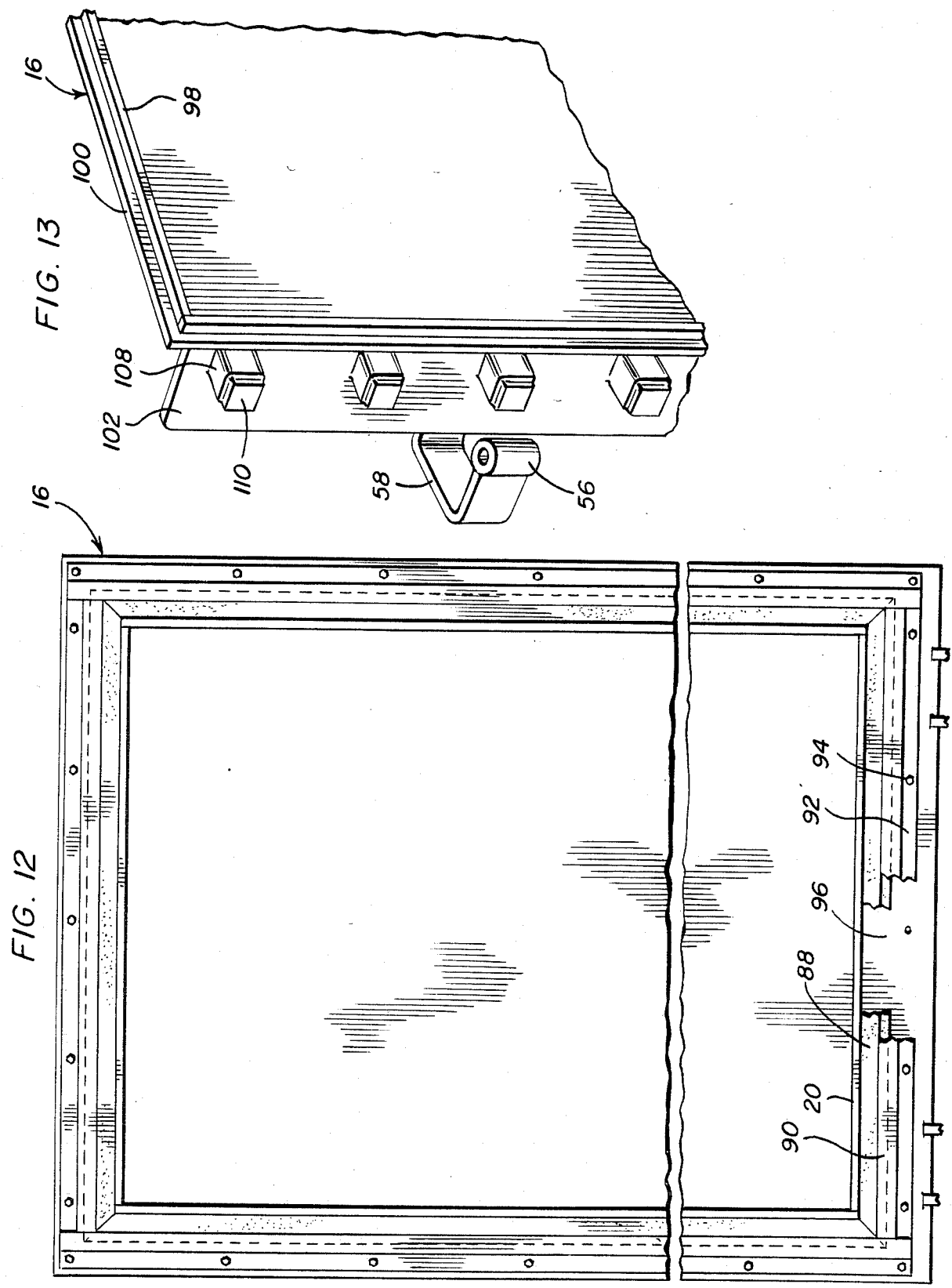

PRESSURE SEALING CLOSURE SYSTEM FOR RETORT VESSELS

BACKGROUND OF THE INVENTION

This invention relates to the construction and operation of closure systems for high pressure vessels.

Generally, high pressure vessels must be securely sealed before internal pressurization. Such vessels and the vessel sealing doors associated therewith are relatively massive and of a high strength construction so as to sustain the high internal pressures and form a pressure sealed enclosure. Opening, closing and locking of the door with the desired degree of seal therefore requires use of powered closure operating systems. However, the use of powered means and the massiveness of the door and vessel presents problems because of material distortion, maintenance of sealing relationships and other conditions adversely affecting vessel closure and opening in a rapid manner.

It is therefore an important object of the present invention to provide an improved system for opening and closing the door of a pressure sealing vessel.

Another object in accordance with the foregoing object is to provide a pressure vessel construction supporting a vessel sealing door capable of being repeatedly opened and closed without rapid deterioration of the sealing relationship between the vessel and door.

SUMMARY OF THE INVENTION

In accordance with the present invention, the door of a pressure retort vessel has hinges fixed thereto to establish a vertical pivotal axis, the hinges being mounted on the vessel for powered raising and lowering of the door parallel to the pivotal axis adjacent an open end of the vessel. In the lowered position only, locking means are aligned for clamping the door to the open end of the vessel by power operated toggle linkages. The linkages are protectively enclosed on both sides of the vessel adjacent the open end. The linkage is self locking. Power operated safety pins prove that the linkage is in the locked position. The door is guidingly supported on rollers when lowered for its limited movement between vessel clamping and release positions.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

Figure 1:
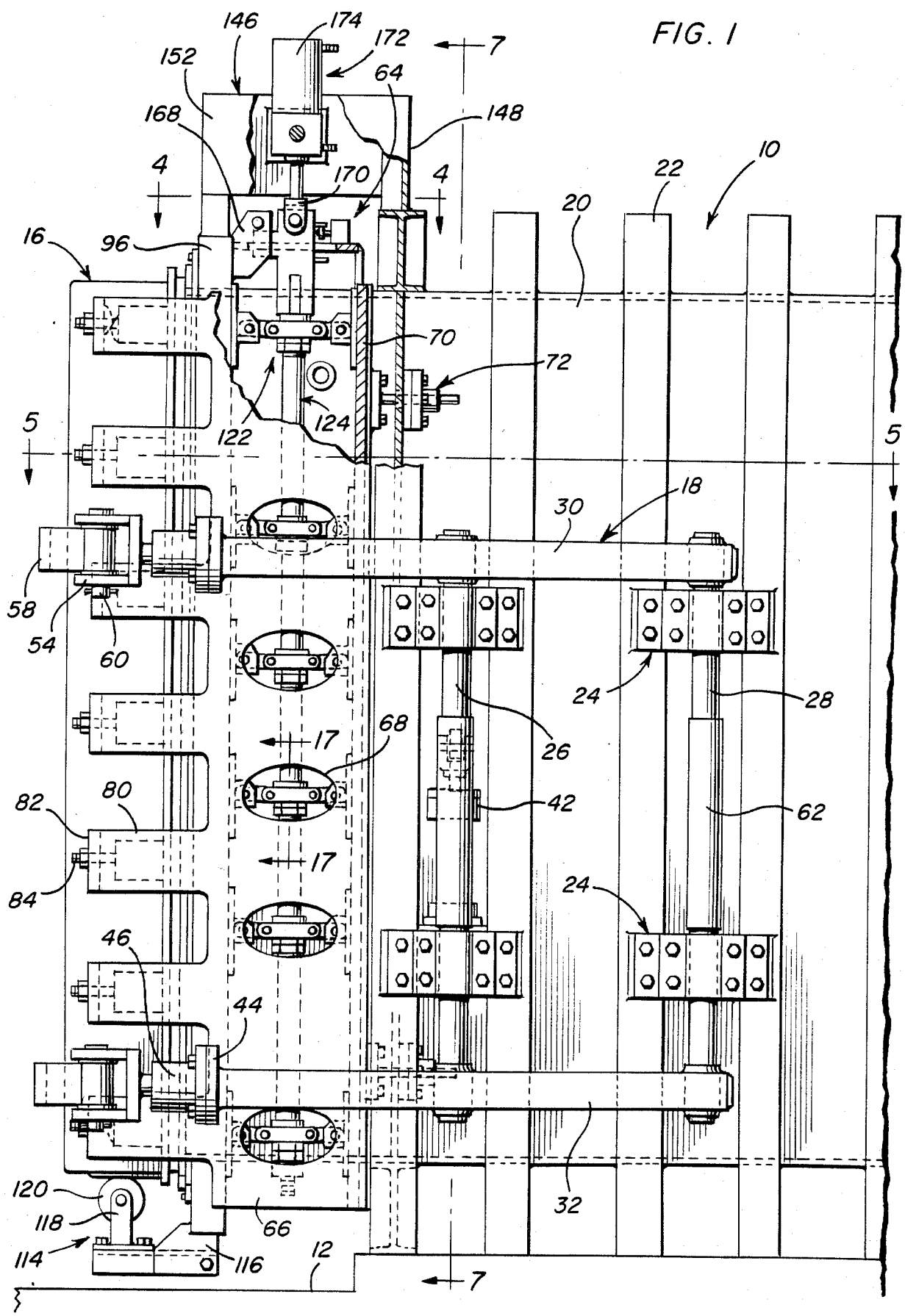
FIG. 1 is a partial side elevation view of a pressure retort vessel at one end portion thereof and its associated pressure sealing door assembly in a closed and locked condition, with parts broken away and shown in section.

FIGS. 4, 5, 7 and 17 are partial section views taken substantially through planes indicated by section lines 4—4, 5—5, 7—7 and 17—17 in FIG. 1.

Figure 2:
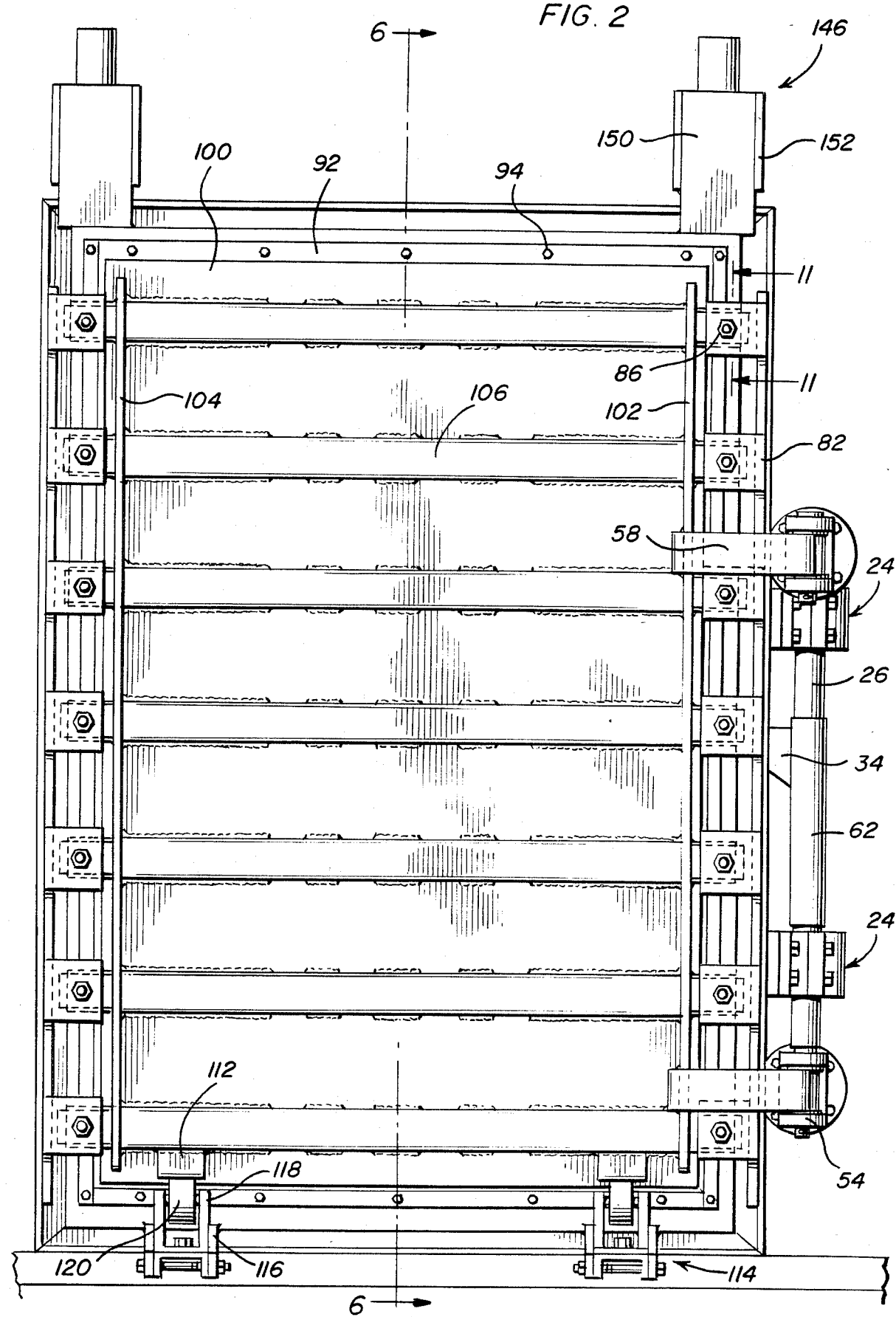
FIG. 2 is an end view of the door assembly on the vessel as shown in FIG. 1.

FIG. 6 is a partial section view taken substantially through a plane indicated by section line 6—6 in FIG. 2.

Figure 3:
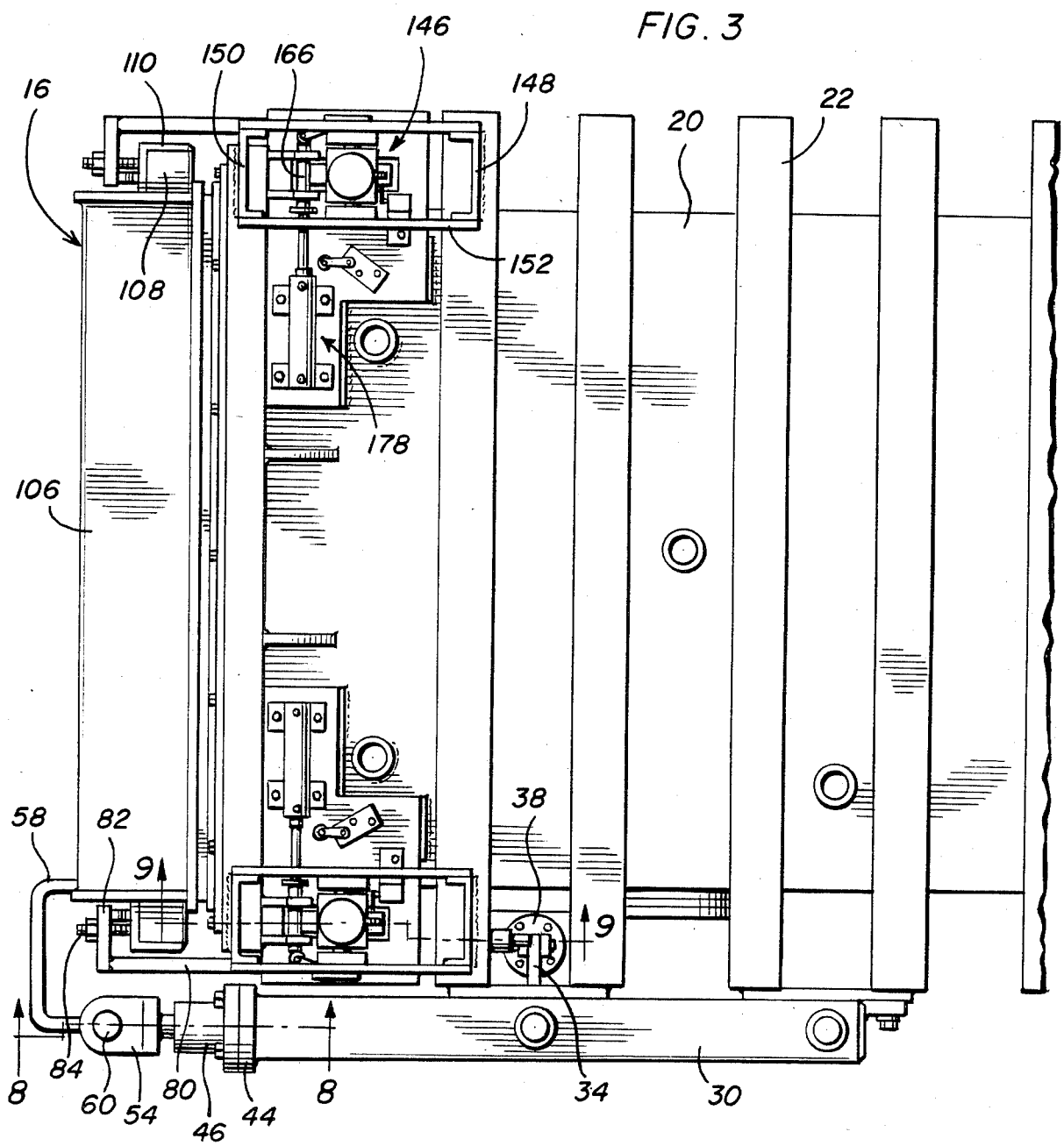
FIG. 3 is a top plan view of the door and vessel end portion as shown in FIG. 1.
Figure 8:
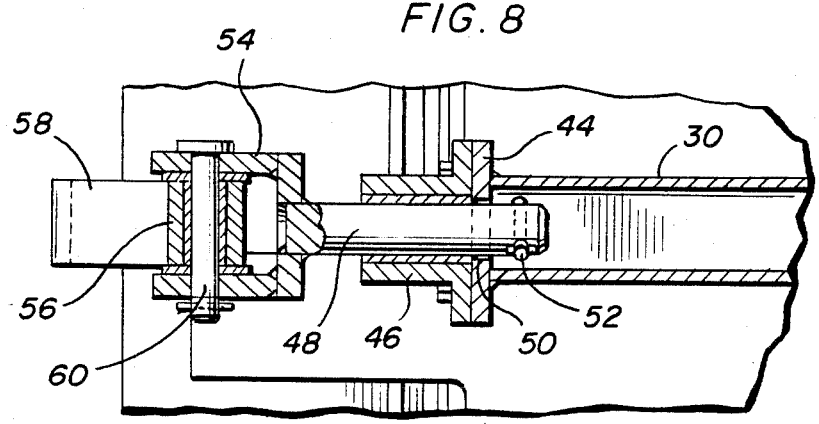
Figure 4:
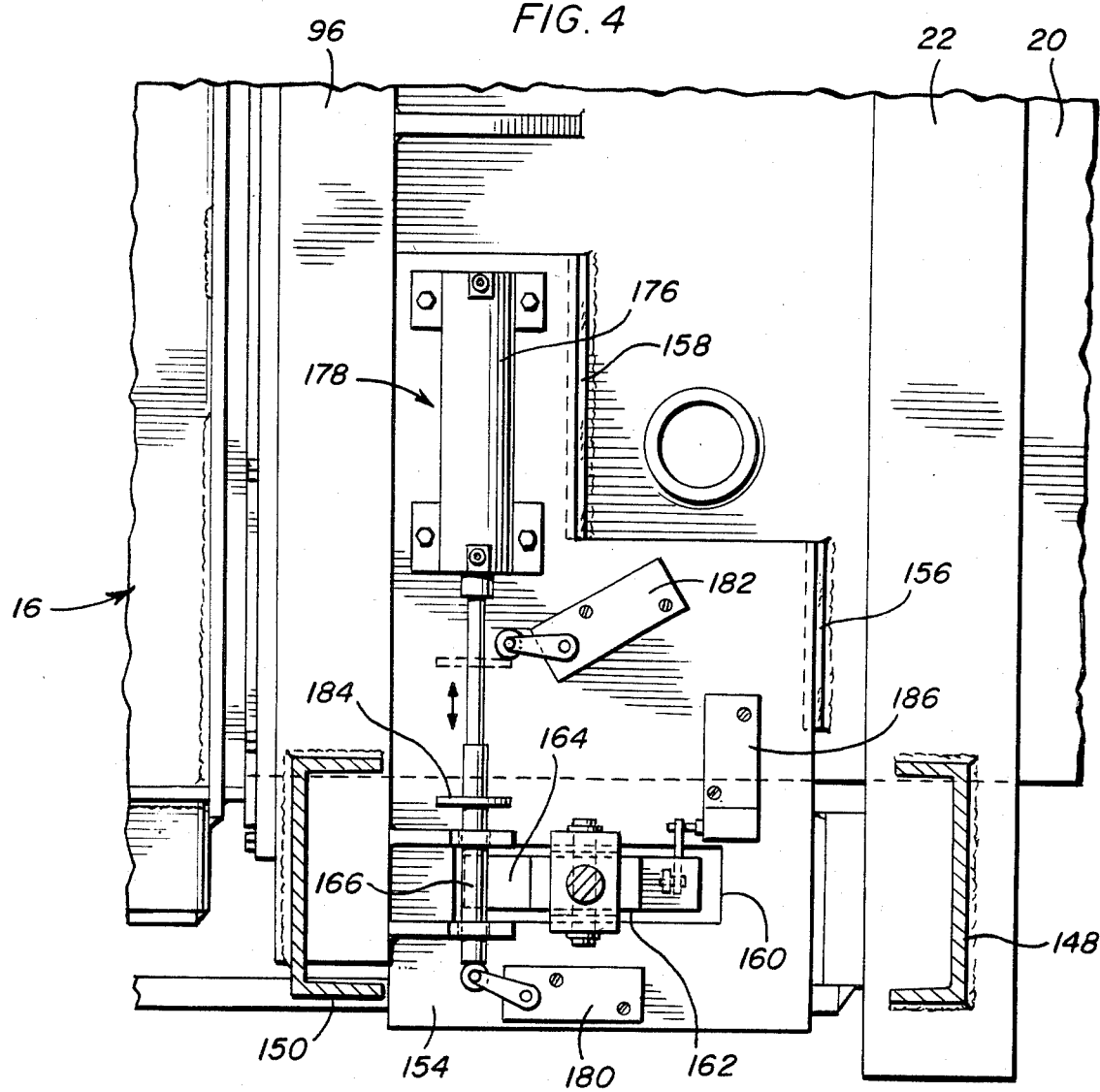
Figure 9:
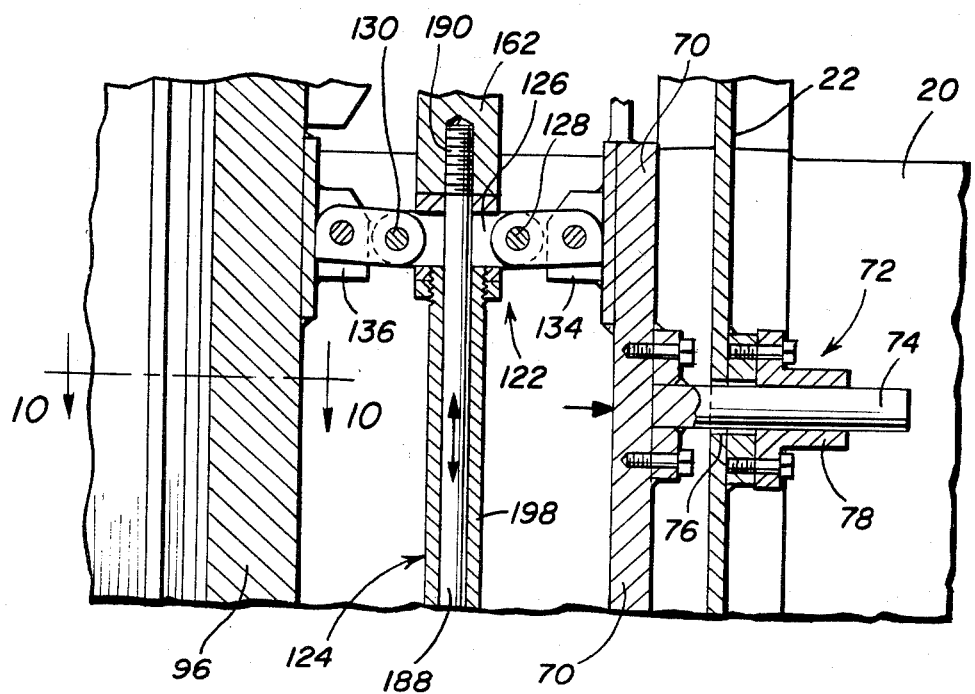

FIGS. 8 and 9 are enlarged partial section views taken substantially through planes indicated by section lines 8—8 and 9—9 in FIG. 3.

Figure 10:
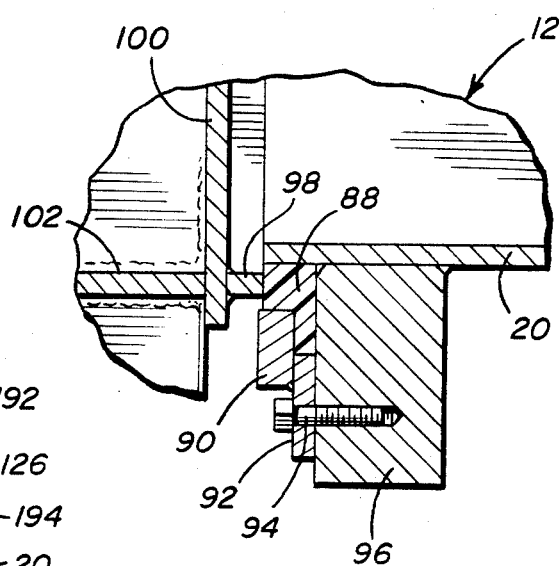

FIG. 10 is an enlarged partial section view taken substantially through a plane indicated by section line 10—10 in FIG. 9.

Figure 11:
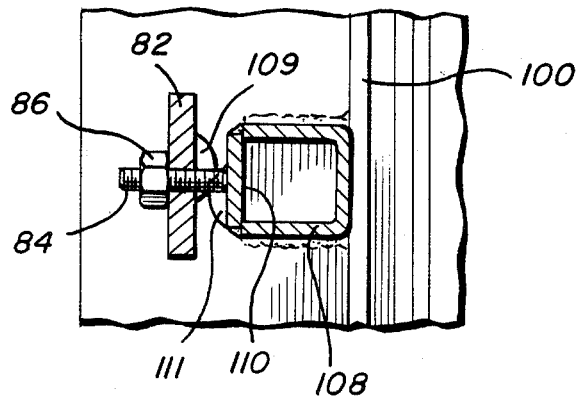

FIG. 11 is an enlarged partial section view taken substantially through a plane indicated by section line 11—11 in FIG. 2.

FIG. 12 is a partial end view of the vessel as viewed from its open end with parts broken away.

FIG. 13 is a perspective view of a corner portion of the disassembled door assembly shown in FIGS. 1, 2, 3 and 5.

Figure 14:
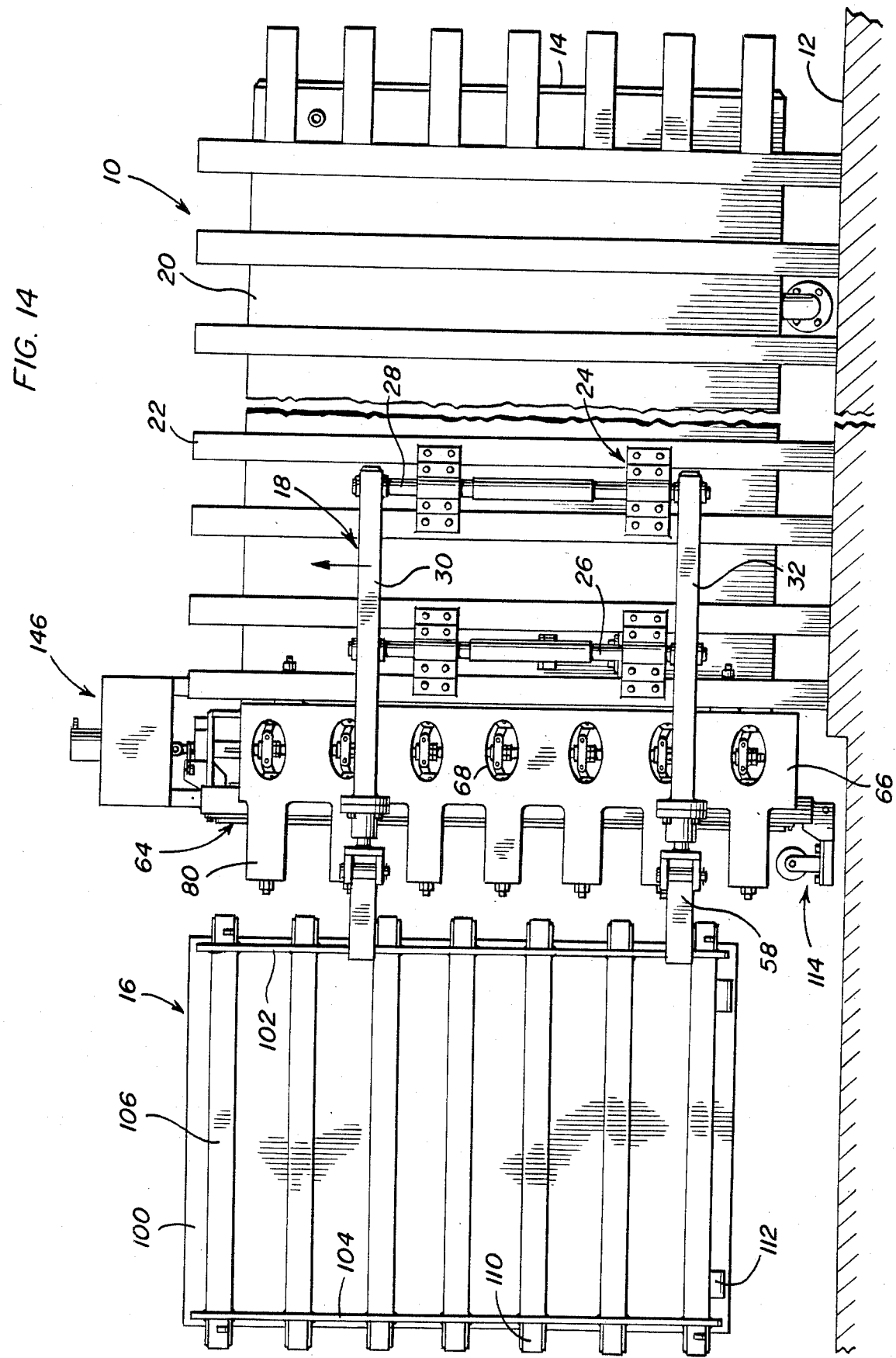

FIG. 14 is a partial side elevation view of the vessel and the door in its open position.

Figure 15:
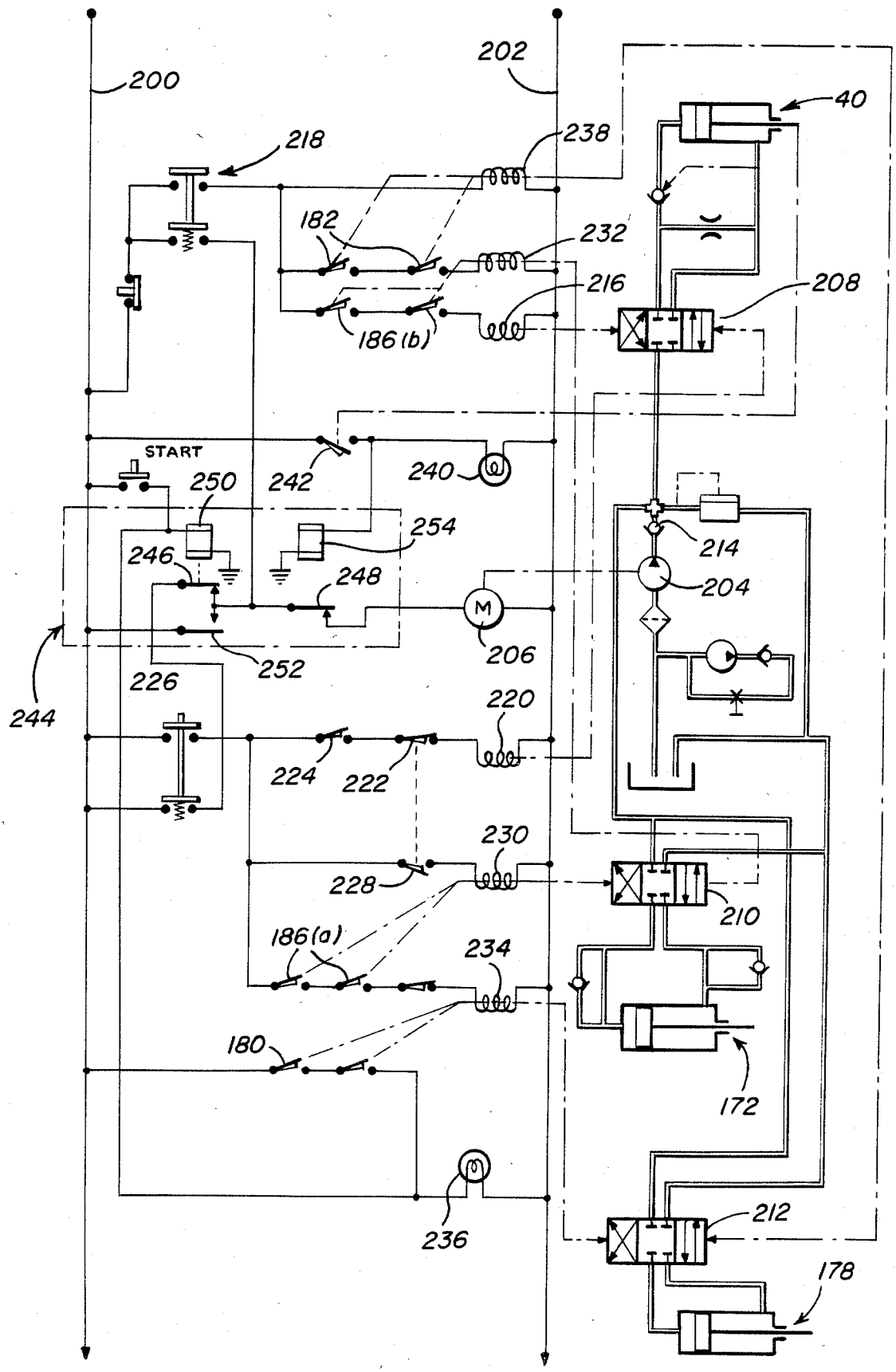

FIG. 15 is an electrical and hydraulic circuit diagram of the control system associated with the vessel and door assemblies shown in FIGS. 1-14.

Figure 16:
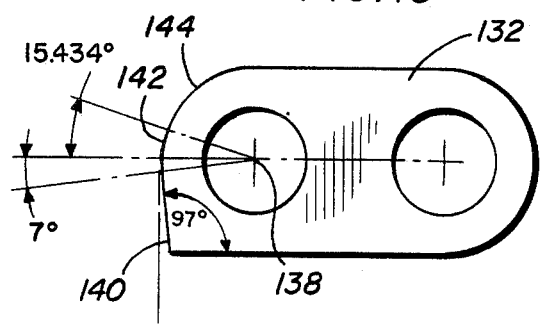

FIG. 16 is an enlarged side elevation view of one of the toggle links disassembled from the linkages shown in FIG. 9.

DETAILED DESCRIPTION OF PREFERRED EMBODIMENT

Referring now to the drawings in detail, FIG. 14 illustrates a retort vessel, generally referred to by reference numeral 10, that is supported on a floor surface 12 and is of a horizontally elongated configuration having a closed longitudinal end portion 14 and an opposite open longitudinal end portion adapted to be closed by a door assembly generally referred to by reference numeral 16. The door assembly is shown in a fully open position in FIG. 14, mounted on the vessel 10 for pivotal movement to a closed position as shown in FIGS. 1, 2 and 3. A hinge supporting assembly generally referred to by reference numeral 18, mounts the door assembly on one side of vessel 10 adjacent to the open longitudinal end portion. The hinge assembly accommodates pivotal movement of the door assembly about a vertical axis between its open and closed positions, vertical movement between raised and lowered positions and horizontal movement between clamps and release positions.

The vessel 10 is generally rectangular in cross section, with its interior chamber enclosed by longitudinal side walls 20 reinforced by longitudinally spaced I beams 22 that are secured as by welding to the external surfaces of the side walls in rectangular encircling relation thereto. The hinge assembly 18 is mounted on one of the side walls by four of the I beams 22 closest to the open end portion of the vessel as shown in FIGS. 1, 5 and 14.

The hinge assembly 18 includes two vertically spaced pairs of slide bearing sections 24 that are fixedly secured to and respectively span two spaced pairs of the I beams 22 to establish two parallel spaced, vertical axes, in a plane spaced from one of the side walls 20, along which the door assembly is vertically displaceable between the raised and lowered positions as aforementioned. Two parallel spaced latch rods 26 and 28 extend through the vertically spaced pairs of bearing sections 24 and are fixed at upper and lower ends thereof to tubular bars 30 and 32 which extend therefrom horizontally toward the door assembly 14 at the open end of the vessel. One of the latch rods 26 has a connecting lug 34 fixed thereto and extending rearwardly therefrom toward the side wall of the vessel as more clearly seen in FIG. 7. The connecting lug 34 is pivotally connected to the upper end of a piston rod 36 extending from the cylinder 38 of a fluid power, door lift piston motor 40. The motor cylinder 38 is fixedly secured to an I beam 22 by a motor support flange 42. The fluid power operated motor 40 is operative to lift and lower the door assembly through the latch rods and horizontal bars 30 and 32 during door opening and closing operations to be described hereinafter. The end of each horizontal bar adjacent the open end of the vessel has a flange 44, welded thereto for coupling to the flanged end of a sleeve bearing 46 through which a shaft section 48 slidably extends as more clearly seen in FIG. 8. One end of the shaft section 48 projects into the tubular bar through an opening 50 in the flange 44 and has a stop pin 52 for limiting its withdrawal from the bar. The other end of the shaft section 48 is welded to a hinge clevis 54 straddling a bearing sleeve 56 at one end of a generally J-shaped hinge strap 58 through which a hinge pin 60 extends. The hinge pin 60 extends through openings in the parallel spaced arms of the clevis 54 aligned with the bearing sleeve 56 to form a pivotal connection with a shaft section 48 that is horizontally displaceable relative to bar 30 or 32 along its longitudinal axis by an amount limited by the pin stop 52 and the clevis 54. The two hinge straps 58 associated with the two vertically spaced bars 30 and 32 are rigidly secured to the door assembly 16 at vertically spaced locations as more clearly seen in FIGS. 1, 2 and 14. The door assembly is accordingly pivotally displaceable about a common vertical axis extending through the vertically spaced hinge pins 60 which are horizontally displaceable by a limited amount relative to the open end of vessel 10 from which the hinge pins are spaced. The hinge pins are also vertically displaceable by an amount limited by abutment of shoulders, at opposite ends of enlarged central portions 62 on the latch rods 26 and 28, with the slide bearing sections 24.

The hinge assembly 18 as hereinbefore described is secured to one side of vessel 10 on the four I beams 22 adjacent to the open end of the vessel and extends in spaced relation to such side wall so as to accommodate one of two locking mechanisms 64 on both vertical sides of the vessel within the spaces remaining between the open end of the vessel and the I beam 22 closest thereto as more clearly seen in FIGS. 1, 3, 5 and 14. Each of the locking mechanisms 64 is protectively enclosed in such spaces by a vertically elongated plate 66 having a plurality of oval-shaped inspection window openings 68 exposing linkages associated with the locking mechanism. The plate 66 is fixed as by welding along one vertical edge to a vertically extending bar 70 as more clearly seen in FIG. 5. The bar 70 is slidably supported at two vertically spaced locations on the web portion of the endmost I beam 22 by guide assemblies 72 as more clearly seen in FIGS. 1 and 9. Each guide assembly 72 includes a guide pin 74 fixed by bolting or welding to the bar 70 and projecting therefrom horizontally through an opening 76 formed in the I beam web in alignment with a guide sleeve 78 fixed to such web. The bar 70 may thereby be guided for limited horizontal displacement relative to the side walls of the vessel adjacent its open end together with the plate 66 fixed thereto.

Each plate 66 is formed with a plurality of vertically spaced clamp fingers 80 projecting beyond the open end of the vessel. A lug 82 is welded to each clamp finger at right angles thereto. A threaded screw element 84 projects from each lug toward the open end of the vessel for clamping of the door assembly in its closed and locked position to the vessel. Each screw element 84 is locked in an adjusted position threaded through its lug 82, by a lock nut 86 as more clearly seen in FIGS. 5 and 11.

As more clearly seen in FIG. 10, a pliable sealing gasket 88 is clamped to the vessel walls 20 at the open end by a clamp rim 90 welded to a holding strip 92 which is secured by fasteners 94 to a backing bar 96 welded to the side walls. The foregoing sealing assembly extends along all four side walls 20 of the vessel at the open end for abutment by the door assembly in the locked position. The door assembly is generally rectangular in the illutrated embodiment so as to seal the open end of the vessel by abutment of the sealing gasket 88 with a sealing element 98 projecting from rectangular panel 100 of the door assembly 16 as more clearly seen in FIGS. 5 and 10. The door assembly also includes a pair of parallel spaced, vertical bars 102 and 104 welded to the side of the panel 100 opposite the sealing element 98. A plurality of vertically spaced tubular stiffener beams 106 are also welded to the same planar side of the panel 100 and extend between the bars 102 and 104 to which they are welded to form a rigid door assembly. Each of the tubular stiffener beams 106 is horizontally aligned with a clamp support 108 welded to the panel 100 on the sides of bars 102 and 104 opposite the ends of the beams 106 as more clearly seen in FIGS. 5 and 11, A right angle clamp surface element 110 is welded to each support 108 for engagement by a screw element 84 projecting from an aligned lug 82 on one of the clamp fingers 80 in the closed and lowered position of the door assembly as aforementioned. Cam formations 109 on the top and bottom lug 82 as shown in FIG. 11 engage cam formations 111 on the elements 110 to prevent hang-up of the door assembly on the screw elements 84.

The aforementioned hinge straps 58 are welded to the bar 102 adjacent one vertical edge of the door assembly, in abutment with the panel 100 and two of the stiffener beams 106 as more clearly seen in FIGS. 2 and 6. The lowermost beam 106 of the door assembly as shown has a pair of horizontally spaced track elements 112 welded thereto and to the panel 100 adjacent its lower edge of engagement with supporting guide assemblies 114 mounted on the vessel adjacent the open end along the bottom. Each guide assembly 114, as more clearly seen in FIGS. 1, 2 and 6, includes a mounting bracket 116 secured to the backing bar 96 and a roller support bracket 118 fastened thereto to position a rotatable guide roller 120 for rolling contact with the elements 112 in the lowered position of the door assembly. Thus, the guide assemblies will guide horizontal movement of the lowered door assembly toward a locked position in which it is clamped to the vessel by the clamp fingers 80 of the locking mechanism.

The locking mechanisms 64 include a plurality of vertically spaced toggle linkages 122 respectively exposed through the window openings 68 in the plates 66 on both vertical sides of the vessel adjacent the open end as aforementioned. The toggle linkages on each side of the vessel are connected to a vertically elongated actuator rod 124. As more clearly seen in FIG. 9, each toggle linkage includes link arms 126 adjustably fixed to the actuator rod and projecting from opposite sides thereof toward the movable bar 70 and the backing bar 96 fixed to the vessel walls 20. Pivot pins 128 and 130 pivotally connect the arms 126 to a pair of toggle links 132. The links 132 are pivotally connected, respectively, to pivot brackets 134 and 136 fixed by bolting or welding to the bars 70 and 96. The links 132 are pivotally displaceable relative to their pivot brackets by a limited amount in a clockwise direction about pivot point 138, as viewed in FIG. 16. Toward that end, the end of link 132 adjacent its bracket 134 or 136 has a beveled edge 140 extending at an angle of 7° from an intermediate edge portion 142 that is tangent to a curved end portion 144 of the link as depicted in FIG. 16. In the position shown in FIG. 9, the linkages 122 are locked by downward pressure on the actuator rod 124 to hold the bar 70 spaced by a maximum distance from the bar 96 at the open end of the vessel. When the rod 124 is displaced upwardly from the position shown in FIGS. 1 and 9, the linkages 122 displace the bars 70 toward the open end of the vessel with the plates 66 and their clamp fingers 80 to release or unlock the door assembly. Displacement of the actuator rods 124 is effected by power operating mechanisms 146 vertically aligned therewith on top of the vessel at each side adjacent the open end as shown in FIGS. 1, 2, 3 and 4.

Each operating mechanism 146 is enclosed between confronting channel sections 148 and 150 respectively welded to and projecting upwardly from the endmost I beam 22 and the bar 96. The channel sections are interconnected by plates 152 spaced above a support base 154 fixed to and spaced above the top wall of the vessel by spacers 156 and 158. The base 154 abuts the bar 96 along one edge and is provided with an opening 160 as more clearly seen in FIGS. 1 and 4, through which a lock operating member 162 extends. The member 162 is connected at its lower end to the upper end of the actuator rod 124. In the lowered locking position of the rod 124,, a lateral extension 164 of the operating member 162 underlies a safety pin 166 inserted through aligned openings in spaced brackets 168 fixed by welding to the base 154 and the bar 96. Accordingly, the safety pins 166 associated with each operating mechanism 146 must be withdrawn from the brackets 168 to permit upward displacement of the operating member 162 for lock releasing purposes. The operating member 162 is connected to clevis 170 to the piston rod depending from a fluid piston motor 172, the cylinder 174 of which is fixed to the vessel through the plates 152. Each safety pin 166 is connected to a piston rod extending, at right angles to the operating member 162, from the cylinder 176 to a fluid piston motor 178 fixed to the base 154. Two limit switch assemblies 180 and 182 are mounted on the base for engagement by the end of the safety pin and an actuator flange 184 spaced therefrom, respectively. The limit switch 180 will therefore detect insertion of the safety pin while the limit switch 182 will detect its withdrawal. Another limit switch assembly 186 is mounted on the base 154 and is engageable by vertically spaced actuators on operating member 162 to detect positioning of the operating member 162 in its lowered locking and raised release positions.

Figure 17:
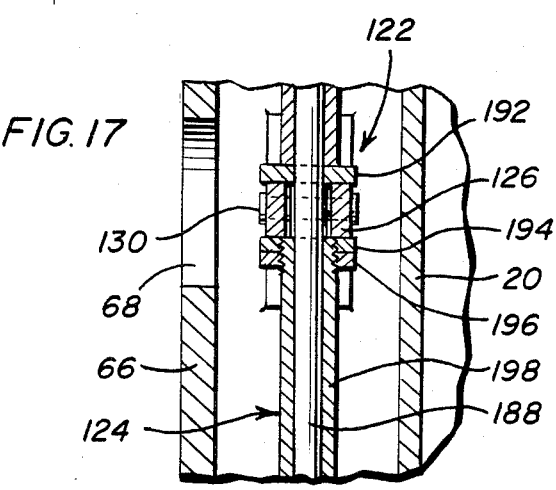

As more clearly seen in FIGS. 9 and 17, each actuating rod 124 includes a single continuous bar 188 welded or threadedly connected at its upper end portion 190 to the operating member 162. The toggle linkage assemblies 122 are adjustably locked in spaced relation on the rod element 188 between spacing discs 192 and 194 by lock nuts 196 threadedly mounted on tubular spacers 198 below the discs 194. It will be apparent from the foregoing arrangement that lifting force applied by the fluid power motor 172 is transmitted by the operating member 162 directly through the bar 188 to the link arms 162 of the lowermost linkage assembly 122, while the spacers 198 transmit such lifting force to the links 126 of the other linkage assemblies thereabove. The link arms 126 may thus be adjustably locked in over-center locations on the actuator rod 124 so that the linkage assemblies 122 are self-locking in the lowered lock positions under internal vessel pressure tending to displace the bar 70 toward bar 96. The linkage assemblies and spacers therefore need only have the strength to develop the locking and unlocking forces. The actuating rod 124 and fluid motor 172 nevertheless have the strength necessary to prevent opening of the door assembly under vessel pressure in the event the linkage assemblies do not pass over-center when displaced to the lock positions by the fluid motor 172. A redundant safety measure is thereby provided.

FIG. 15 illustrates the hydraulic and electrical control system through which the fluid power motors 40, 172 and 178 are operated to respectively (1) raise or lower the door, (2) clampingly lock or unlock the door, and (3) insert or withdraw the safety locking pins 166 as aforementioned. Electrical operating energy is supplied to the control system through a pair of operating voltage lines 200 and 202 while fluid operating pressure is generated by a pump 204 driven by an electrically powered pump motor 206. Bidirectionally actuated control valves 208, 210 and 212 are hydraulically connected to the output side of pump 204 through the check valve 214 to pressurize the fluid motors. The control valve 208 is actuated from a neutral position in one direction by a door lift solenoid 216 connected in series with the switches 186(b) of the limit switch assemblies 186 across the power lines 200 and 202 in series with a door opening push-button switch 218. The push-button switch is biased to its open position as shown and is momentarily closed when actuated. The control valve 208 is also actuated in the other direction by a door lowering solenoid 200 in series with limit switches 222 and 224 and a door-closing push-button switch 226 connected across the power lines 200 and 202. The limit switches 222 and 224 respectively detect the door in its lowered position and clamping thereof in its locked condition. The limit switch 222 is ganged with a control switch 228 connected across the power lines in series with the door closing switch 226 and a lock solenoid 230 energized to actuate the control valve 210 in one direction from its neutral position. The control valve 210 is actuated in the other direction by a door-unlocking solenoid 232 connected in series with the switches of the limit switch assemblies 182 and the door-opening switch 218. Finally, the control valve 212 is actuated in one direction by a pin inserting solenoid 234 connected in series with limit switches 186 (a) of the limit switch assemblies 186 and the door-closing switch 226. The switches 186(a) detect locking of the door in response to energization of solenoid 230 while limit switches 186(b) detect unlocking of the door in response to energization of solenoid 232. Insertion of the safety pins in response to energization of solenoid 234 is detected by the switches of limit switch assemblies 180 connected in series with a locked door indicator lamp 236 across the power lines. The control valve 212 is actuated in the pin retracting direction by energization of a solenoid 238 connected in series with the door opening switch 218 across the power lines. A door open indicator lamp 240 is connected across the power lines in series with a limit switch 242 detecting the door when elevated to its raised position in response to pressurizing of the fluid motor 40 by actuation of control valve 208 by solenoid 216.

The control valves 208, 210 and 212 in their neutral positions block flow of fluid to and from the fluid motors so as to hydraulically lock the motors in the positions assumed prior to deenergization of their respective valve actuating solenoids. The pump motor 206 is energized to operate the pump 204 in response to a door closing or opening operation initiated by momentary closing of switch 226 or 218 through relay section 244. Closing of switch 226 to close the door establishes an energizing circuit for motor 206 through normally closed relay switches 246 and 248 of the relay section connected in series with motor 206. When the limit switches 180 are closed upon completion of a door closing operation, the locked door indicator lamp 236 is energized and a parallel energizing circuit is completed through relay coil 250 to open relay switch 246 and close normally open relay switch 252 so as to maintain the pump motor energized through relay switch 248.

The pump motor 206 may also be energized through relay switch 248 to open the door by actuation of the push-button switch 218. When the door opening operation is completed, the open indicator lamp 240 is energized by closing of limit switch 242 which energizes relay coil 254 in the relay section 244. Normally closed relay switch 248 is thereby opened to deenergize the pump motor 206.

With continued reference to FIG. 15, a door opening operation is initiated by actuating the push-button switch 218 after the vessel 10 has completed a cycle and the pressure therein has been reduced to 2.0 psig, for example. Energizing circuits are thereby completed across the power lines 200 and 202 for the pin retract solenoid 238 to fully retract the safety pins 166 by actuation of the control valve 212 through which the fluid piston motor 178 is operated. The normally open limit switches 182 are thereby closed to energize the door unlocking solenoid 232 and actuate the control valve 210 which operates the piston motor 172 to unlock the door through the toggle linkages 122. When the door is unlocked, limit switches 186(b) are closed on both sides to energize the door lift solenoid 216 which is operative through control valve 208 to operate the door lift piston motor 40. The door is thereby raised clear of the clamp fingers 80 and closes the normally open limit switch 242 to energize motor relay coil 254. Relay switch 248 is thereby opened to deenergize the pump motor 206 and cut off the flow of pressurized oil from pump 204 to the cylinder 38 of the door lift piston motor 40 through control valve 208. Closing of the limit switch 242 also energizes the door open indicator lamp 240 to signify that the door has been unlocked and may be swung open to the position shown in FIG. 14.

To close the door, it is swung to a closed position until limit switch 224 is closed before actuation of the door closing switch 226 initiates a locking operation. The door lowering solenoid 220 is then energized to actuate control valve 208 in a door lowering direction and operate the piston motor 40 in such lowering direction. When the door is in the proper lowered position, the ganged limit switches 222 and 228 are actuated to deenergize the lowering solenoid 220 and energize the lock solenoid 230. The solenoid 230 then actuates the control valve 210 in a locking direction to correspondingly operate the door clamping motor 172 resulting in the closing of the limit switches 186(b) on both sides of the properly locked door. Closing of the limit switches 186(b) energizes the pin solenoid 234 to actuate the control valve 212 for operation of the safety pin motor 178 in a pin inserting direction. When the safety pins 166 are properly inserted, the limit switches 180 are closed to energize the locked door indicator lamp 236 and the relay coil 250 in the relay section 244. With relay coil 250 energized, the normally open relay switch 252 is closed to maintain the pump motor 206 energized. Pressurized fluid will therefore remain in the cylinders of the lift, clamp and safety pin motors 40, 172 and 178 while the door is locked as an additional safety measure.

Portions of the control system hereinbefore described including the control valves and associated valve-actuating solenoids, the pump 204 and pump motor 206 together with the interrelating fluid circuit components may be housed within a suitable enclosure adjacent to the vessel 10. The push-button switches 218 and 226, the relay section 244 and the indicator lamps 236 and 240 may be mounted together with the associated electrical wiring behind a suitable control board panel conveniently located adjacent the vessel for use by operator personnel. The control circuit may be interfaced with other hardware such as vessel pressure and retort cycle controls.

The foregoing is considered as illustrative only of the principles of the invention. Further, since numerous modifications and changes will readily occur to those skilled in the art, it is not desired to limit the invention to the exact construction and shown and described, and accordingly, all suitable modifications and equivalents may be resorted to, falling within the scope of the invention.

What is claimed as new is as follows:

1. In combination with a vessel having an open end and a door adapted to be displaced between an open position and a closed position sealing the open end of the vessel, the improvement comprising means mounting the door on the vessel for pivotal displacement about a pivotal axis between said open and closed positions and linear displacement parallel to said pivotal axis between raised and lowered positions, locking means for clamping the door to the vessel only in the closed position thereof, power operated means connected to the door and to the locking means for effecting said linear displacement and clamping of the door to the vessel, and control means operatively connected to the power operated means for limiting said clamping of the door to the lowered position thereof.

2. The improvement as defined in claim 1 including safety means controlled by the power operated means for releasably holding the locking means engaged with the door in the lowered position clamped to the vessel.

3. The improvement as defined in claim 2 wherein the power operated means includes fluid motors respectively connected to the door, the locking means and the safety means.

4. The improvement as defined in claim 3 wherein the locking means includes a clamping means mounted on the vessel for displacement in a direction transverse to said linear displacement of the door between clamping and release positions relative to the vessel, clamp abutment means fixedly mounted on the door for alignment with said clamping means only in the lowered position of the door, and linkage means mounted on the vessel and operatively connecting the power operated means to the clamping means for engagement with the abutment means.

5. The improvement as defined in claim 4 wherein the clamping means includes a protective element slidably mounted on the vessel in enclosing relation to the linkage means and a clamp finger projecting from said protective element beyond the open end of the vessel in alignment with the clamp abutment means in the lowered position of the door.

6. The improvement as defined in claim 5 wherein the linkage means includes an actuator rod connected to the power operated means, a link arm axially fixed to the rod, and toggle links pivotally connecting said link arm to the vessel and the protective element of the clamping means.

7. The improvement as defined in claim 6 wherein the linkage means further includes adjustment means for fixedly positioning the link arm on the rod in over-center position relative to the toggle links in the clamping position of the clamping means.

8. The combination of claim 7 including hinge means connected to the door for establishing said pivotal axis about which the door is displaceable between the open and closed positions, the improvement further including means slidably mounting the hinge means on the vessel for limited displacement relative thereto in response to said clamping of the door to the vessel by the locking means.

9. The improvement as defined in claim 1 wherein the locking means includes clamping means mounted on the vessel for displacement in a direction transverse to said linear displacement of the door between clamping and release positions relative to the vessel, clamp abutment means fixedly mounted on the door for alignment with said clamping means only in the lowered position of the door, and linkage means mounted on the vessel and operatively connecting the power operated means to the clamping means for engagement with the abutment means.

10. The improvement as defined in claim 9 wherein the clamping means includes a protective element slidably mounted on the vessel in enclosing relation to the linkage means and a clamp finger projecting from said protective element beyond the open end of the vessel in alignment with the clamp abutment means in the lowered position of the door.

11. The improvement as defined in claim 10 wherein the linkage means includes an actuator rod connected to the power operated means, a link arm axially fixed to the rod, and toggle links pivotally connecting said link arm to the vessel and the protective element of the clamping means.

12. The improvement as defined in claim 11 wherein the linkage means further includes adjustment means for fixedly positioning the link arm on the rod in over-center position relative to the toggle links in the clamping position of the clamping means.

13. The improvement as defined in claim 9 wherein the linkage means includes an actuator rod connected to the power operated means, a link arm axially fixed to the rod, and toggle links pivotally connecting said link arm to the vessel and the clamping means.

14. The improvement as defined in claim 13 wherein said linkage means further includes adjustment means for fixedly positioning the link arm on the rod in over-center position relative to the toggle links in the clamping position of the clamping means.

15. In combination with a vessel having an open end, a door, hinge means connected to the door for establishing a pivotal axis about which the door is displaceable between open and closed positions, and locking means for clamping the door to the vessel in the closed position of the door to seal the open end, the improvement comprising means mounting the hinge means on the vessel for respective displacement of the door and the hinge means along transverse directions relative to the vessel, power operated means connected to the mounting means for displacing the door along one of said transverse directions between locking and release positions, and powered linkage means mounted on the door for operation of the locking means only in the locking position of the door causing said displacement of the hinge means along the other of the transverse directions.

16. The improvement as defined in claim 15 wherein said one of the transverse directions is parallel to the pivotal axis.

17. The improvement as defined in claim 16 wherein the locking means includes a protective element slidably mounted on the vessel adjacent the open end in enclosing relation to the linkage means, a clamp finger projecting from said protective element beyond the open end of the vessel and abutment means mounted in the door for alignment with the clamp finger only in the locking position of the door.

18. The improvement as defined in claim 17 wherein the linkage means includes an actuator rod connected to the power operated means, a link arm axially fixed to the rod, and toggle links pivotally connecting said link arm to the vessel and the locking means.

19. The improvement as defined in claim 15 wherein the locking means includes a protective element slidably mounted on the vessel adjacent the open end in enclosing relation to the linkage means, a clamp finger projecting from said protective element beyond the open end of the vessel and abutment means mounted in the door for alignment with the clamp finger only in the locking position of the door.

20. The improvement as defined in claim 19 wherein the linkage means includes an actuator rod connected to the power operated means, a link arm axially fixed to the rod, and toggle links pivotally connecting said link arm to the vessel and the locking means.

21. The improvement as defined in claim 20 including guide roller means mounted on the vessel adjacent said open end for support of the door during said displacement of the hinge means along said other of the transverse directions.

22. The improvement as defined in claim 15 including guide roller means mounted on the vessel adjacent said open end for support of the door during said displacement of the hinge means along said other of the transverse directions.

* * * * *